US008741144B2

(12) United States Patent
Phillips et al.

(10) Patent No.: US 8,741,144 B2
(45) **Date of Patent: *Jun. 3, 2014**

(54) METHOD FOR REMOVING SOLUTE FROM A SOLID SOLUTE-BEARING PRODUCT

(75) Inventors: Darrell J. Phillips, Zachary, LA (US); George Baxter Russell, Baton Rouge, LA (US)

(73) Assignee: Epic Oil Extractors, LLC, Ponchatoula, IA (US)

( * ) Notice: Subject to any disclaimer, the term of this patent is extended or adjusted under 35 U.S.C. 154(b) by 37 days.

This patent is subject to a terminal disclaimer.

(21) Appl. No.: 12/948,602

(22) Filed: Nov. 17, 2010

(65) Prior Publication Data

US 2011/0288318 A1 Nov. 24, 2011

Related U.S. Application Data

(60) Division of application No. 12/130,380, filed on May 30, 2008, now abandoned, which is a continuation of application No. 11/011,639, filed on Dec. 14, 2004, now Pat. No. 7,384,557, which is a continuation-in-part of application No. 10/892,064, filed on Jul. 14, 2004, now abandoned.

(60) Provisional application No. 60/486,743, filed on Jul. 14, 2003.

(51) Int. Cl.
*B01D 11/00* (2006.01)

(52) U.S. Cl.
USPC .......... 210/634; 196/14.52; 208/87; 208/428; 210/639

(58) Field of Classification Search
USPC ................. 210/634, 639, 774, 805, 806, 511; 554/8–21; 208/13, 87, 428, 429, 45, 208/96, 390, 391, 258, 259; 422/255–257, 422/273; 196/14.52
See application file for complete search history.

(56) References Cited

U.S. PATENT DOCUMENTS

| | | | | |
|---|---|---|---|---|
| 1,802,533 | A | 4/1931 | Reid | |
| 1,849,886 | A | 3/1932 | Rosenthal | |
| 2,247,851 | A | 7/1934 | Rosenthal | |
| 2,183,837 | A | 12/1939 | Hamilton et al. | |
| 2,281,865 | A | 5/1942 | Van Djick | |
| 2,538,007 | A | 1/1951 | Kester | |
| 2,548,434 | A | 4/1951 | Leaders | |
| 2,560,934 | A | 7/1951 | Dickinson | |
| 2,564,409 | A | 8/1951 | Rubin | |
| 2,619,024 | A * | 11/1952 | Flosdorf et al. | 99/289 R |
| 2,682,551 | A | 6/1954 | Miller | |
| 2,727,914 | A | 12/1955 | Gastrock et al. | |
| 2,847,282 | A | 8/1958 | Dunning et al. | |
| 2,932,559 | A | 4/1960 | Placek | |
| 3,126,904 | A | 3/1964 | Ciarlariello | |
| 3,261,690 | A | 7/1966 | Wayne | |
| 3,565,634 | A | 2/1971 | Osterman | |
| 3,923,847 | A | 12/1975 | Roselius et al. | |

(Continued)

*Primary Examiner* — Joseph Drodge
(74) *Attorney, Agent, or Firm* — Dickinson Wright, PLLC

(57) ABSTRACT

The process and apparatus are for removing a solute from a solute-bearing solid product by means of a solvent which remains in liquid state throughout the entire oil extraction process. In one embodiment, the solvent is normally in gaseous state at ambient temperature and pressure values, but is used mainly in liquid state within the method and apparatus of the present invention by maintaining such pressure and temperature values within the apparatus so that the solvent will remain in this liquid state.

6 Claims, 5 Drawing Sheets

(56) References Cited

U.S. PATENT DOCUMENTS

| | | | | |
|---|---|---|---|---|
| 3,939,281 | A | | 2/1976 | Schwengers |
| 3,941,679 | A | * | 3/1976 | Smith et al. .................. 208/390 |
| 3,966,981 | A | | 6/1976 | Schultz |
| 3,966,982 | A | | 6/1976 | Becker et al. |
| 4,311,561 | A | * | 1/1982 | Hastings .................... 196/14.52 |
| 4,331,695 | A | | 5/1982 | Zosel |
| 4,617,177 | A | | 10/1986 | Schumacher |
| 4,675,133 | A | | 6/1987 | Eggers et al. |
| 4,744,926 | A | | 5/1988 | Rice |
| 4,765,257 | A | | 8/1988 | Abrishamian et al. |
| 4,770,780 | A | | 9/1988 | Moses |
| 4,848,918 | A | | 7/1989 | Kingsley et al. |
| 4,877,530 | A | | 10/1989 | Moses |
| 5,041,245 | A | | 8/1991 | Benado |
| 5,210,240 | A | | 5/1993 | Peter et al. |
| 5,281,732 | A | | 1/1994 | Franke |
| 5,405,633 | A | | 4/1995 | Heidlas et al. |
| 5,482,633 | A | | 1/1996 | Muraldihara et al. |
| 5,525,746 | A | | 6/1996 | Franke |
| 5,676,737 | A | * | 10/1997 | Whitlock .......................... 95/90 |
| 5,707,673 | A | | 1/1998 | Pevost et al. |
| 5,980,964 | A | | 11/1999 | Walters et al. |
| 6,111,119 | A | | 8/2000 | Trout |
| 6,554,995 | B2 | * | 4/2003 | Sprenger et al. .............. 208/321 |
| 6,569,480 | B2 | | 5/2003 | Hall et al. |
| 6,711,830 | B2 | | 3/2004 | Hensley et al. |
| 6,749,752 | B2 | | 6/2004 | Trout |
| 7,384,557 | B2 | * | 6/2008 | Phillips et al. ................ 210/634 |
| 8,398,857 | B2 | * | 3/2013 | Phillips ......................... 210/634 |
| 2002/0134704 | A1 | * | 9/2002 | Mitchell et al. ................. 208/13 |
| 2003/0077367 | A1 | | 4/2003 | Trout |

* cited by examiner

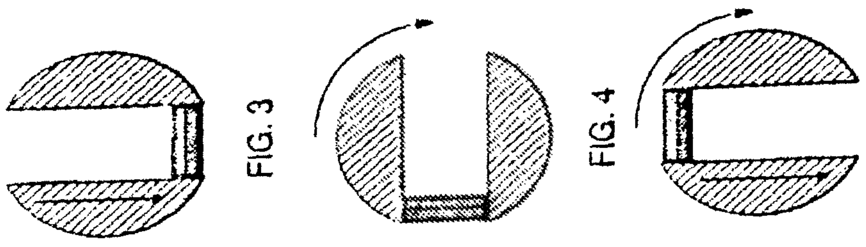
FIG. 3
FIG. 4
FIG. 5
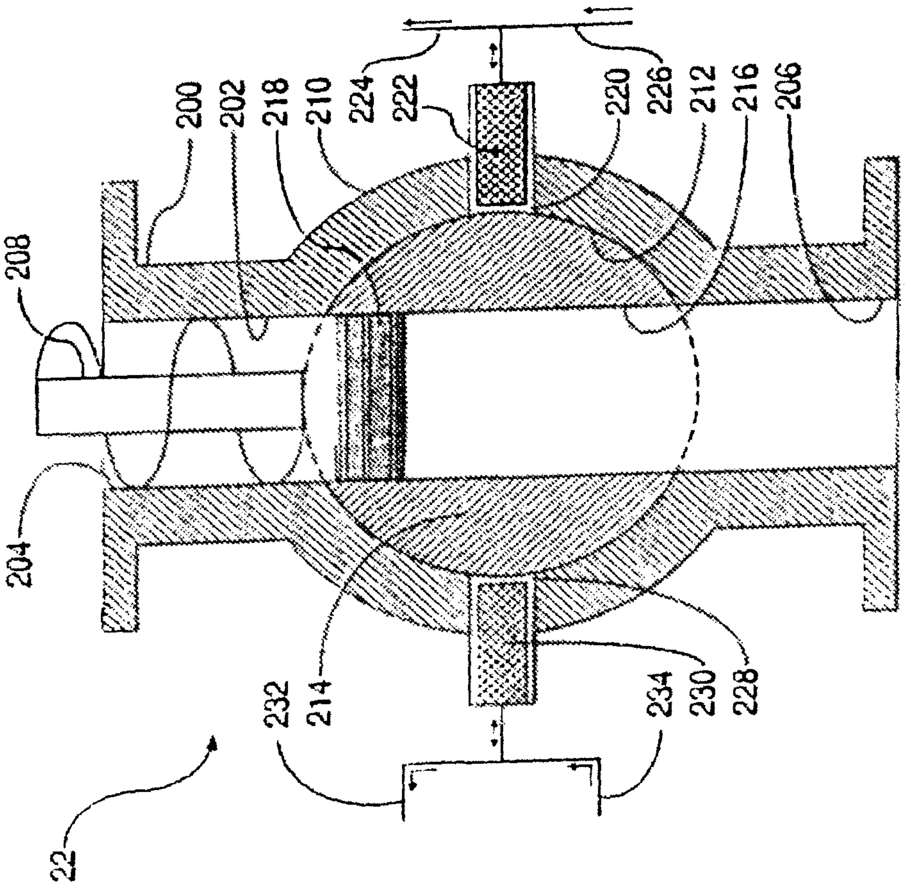
FIG. 2

METHOD FOR REMOVING SOLUTE FROM A SOLID SOLUTE-BEARING PRODUCT

CROSS-REFERENCE DATA

This is a divisional of co-pending U.S. Ser. No. 12/130,380, filed May 30, 2008, which is a continuation of U.S. Ser. No. 11/011,639, filed on Dec. 14, 2004, now U.S. Pat. No. 7,384,557, which is a continuation-in-part of U.S. Ser. No. 10/892,064, filed on Jul. 14, 2004, now abandoned, which claims the benefit of U.S. Ser. No. 60/486,743, filed on Jul. 14, 2003, which is incorporated herein by reference.

FIELD OF THE INVENTION

The present invention generally relates to a method and apparatus for removing solute from solute-bearing solid product, and more particularly to a method and apparatus for removing oil from an oil-bearing solid product by means of a solvent that leaches the oil from the oil-bearing product.

BACKGROUND OF THE INVENTION

Processes for removing oil from solid oil-bearing products are known in the art. Some such processes occur in an extraction chamber where a solvent is sprayed or otherwise injected on the oil-bearing product, to leach the oil out of the solid product. There results a miscella comprising a mixture of oil and solvent, which is conveyed to an oil-solvent separation chamber.

Some processes make use of a liquid solvent which is liquid at given extraction temperature and pressure values, but which is normally gaseous at ambient temperature and pressure values. After having leached the oil out of the solid product with the liquid-state solvent in the extraction chamber, the miscella is separated into its distinct oil and solvent components in the separation chamber which is heated to such a temperature that the solvent becomes gaseous while the oil remains liquid, thus allowing the oil and solvent to be easily distinctly collected.

One problem associated to such prior art processes is that the oil and the solids will often be denatured by the application of heat to the solids and/or oil, which is undesirable. Denaturing is defined as any physical, chemical or molecular change in the solute or solid product. This is especially true, in prior art processes, during the separation phase of the miscella, where relatively high oil-denaturing temperatures are often reached.

SUMMARY OF THE INVENTION

The present invention relates to a process for separating a solute from a solute-bearing solid product comprising the steps of providing an extraction chamber with determined extraction pressure and temperature values; controlling said extraction pressure to maintain it above an ambient pressure value; controlling said extraction temperature to maintain it at a temperature that will not denature said solute nor said solid product; feeding said solute-bearing solid product in said extraction chamber; providing a solvent which is in mainly liquid state at said extraction pressure and temperature values, with said solute being soluble in said solvent at said extraction pressure and temperature values; injecting said solvent in liquid state on said solute-bearing product in said extraction chamber for leaching said solute from said solid product with said solvent; distinctly recuperating said solid product from which at least a portion of said solute has been leached, and a miscella comprising a mixture of said solvent and said solute leached from said solid product; conveying said miscella to a separation unit with determined separation temperature and pressure values, with said solvent remaining mainly in liquid state at said separation temperature and pressure values, and with said separation unit temperature value being controlled to maintain it at a temperature that will not denature said solute;

separating said solvent from said solute in said separation unit through a liquid-liquid separation process; and distinctly recuperating said solvent and said solute separated in said separation unit; wherein said solvent remains mainly in a liquid-state throughout said process.

In one embodiment, said solvent is in gaseous state at ambient temperature and pressure values but mainly in liquid-state at said extraction temperature and pressure values.

In one embodiment, said extraction and separation temperatures are equal to ambient temperature, with said solvent being maintained mainly in liquid-state throughout said process by means of said extraction and separation pressures being maintained above ambient pressure.

In one embodiment, said solvent recuperated from said separation unit is reutilized within said extraction chamber for extracting additional solute from additional said solute-beating material, whereby said solvent is used within a closed-loop circuit and remains mainly in liquid state throughout said closed-loop circuit.

In one embodiment, said liquid-liquid separation process is one of molecular weight, specific gravity and viscosity differential separation processes.

In one embodiment, said process is a batch process, with the step of feeding said solute-bearing solid product in said extraction chamber being accomplished by loading a batch of solute-bearing solid product in said extraction chamber.

In an alternate embodiment, said process is a continuous process, with the step of feeding said solute-bearing solid product in said extraction chamber being accomplished by continuously circulating the solute-bearing product through said extraction chamber and continuously recuperating solid product from which at least a portion of oil has been leached at an outlet of said extraction chamber.

In one embodiment, said extraction chamber comprises a number of extraction chamber portions through which said solute-bearing product is sequentially circulated for extracting solute from the solute-bearing solid product, with each extraction chamber portion defining corresponding extraction chamber parameters and with at least some extraction chamber parameters differing from one extraction chamber to the other.

In one embodiment, the step of injecting said solvent in said extraction chamber is accomplished by means of at least one spray nozzle extending in said extraction chamber capable of forming a vortex-shaped solvent spray pattern.

In one embodiment, the step of continuously circulating said solute-bearing product through said extraction chamber is accomplished by means of an auger equipped with agitation paddles, said process further comprising the step of agitating particles of said solute-bearing product to promote the formation of free-floating solid product particles that will be at least partly carried into said vortex-shaped solvent spray pattern.

In one embodiment, the step of controlling said extraction pressure to maintain it above an ambient pressure value is accomplished by means of a gas injector injecting in said extraction chamber one of a vapor of said solvent and a gas which is unreactive with said solvent, oil and solid product.

The present invention also relates to an apparatus for separating oil from an oil-bearing solid product comprising: an extraction chamber; a solvent injector for injecting solvent in said extraction chamber for leaching oil from the oil-bearing solid product to form a miscella comprising a mixture of solvent and oil; a miscella outlet in said extraction chamber for collecting miscella; and a liquid-liquid separation unit linked to said miscella outlet, for separating the miscella into its respective oil and solvent components; wherein solvent injected in said extraction chamber remains mainly in liquid state to leach oil from the oil-bearing product to form therewith the miscella, and remains mainly in liquid state in said liquid-liquid separation unit.

In one embodiment, the apparatus further comprises an inlet valve located upstream of said extraction chamber and allowing said oil-bearing solid product to enter said extraction chamber without allowing the passage of fluid between said extraction chamber and the atmosphere; an outlet valve located downstream of said extraction chamber and allowing the solid product from which oil has been leached to exit said extraction chamber without allowing the passage of fluid between said extraction chamber and the atmosphere; and an impeller for circulating said solid product from said inlet valve through said extraction chamber towards said outlet valve; wherein said apparatus allows the continuous feeding of solid product to said inlet valve, the continuous leaching of oil from the solid product, the continuous output of solid product from said outlet valve, and the continuous collection of miscella at said miscella outlet.

In one embodiment, the apparatus further comprises a security solvent extraction unit downstream of said outlet valve, for removing residual solvent vapors by the application of heat to the solid product.

The present invention further relates to a valve defining an inlet and an outlet, for allowing a solid product to pass from said inlet to said outlet while preventing fluids from being exchanged between said inlet and outlet, comprising: an inner channel extending between said inlet and said outlet; a fluid exhaust port in said inner channel intermediate said inlet and outlet, said fluid exhaust port being in communication with a vacuum pump and being equipped with a filter allowing passage of fluids through said fluid exhaust port but preventing passage of the solid product through said fluid exhaust port; a rotary valve member located in said inner channel and being rotatable therein, said rotary valve member comprising a main body engaging said inner channel in a fluid-tight manner and having an elongated transversal channel, said rotary valve member being capable of rotating between a first position in which said transversal channel is coextensive and communicates with said valve inner channel and in which said main body obstructs said fluid exhaust port, and a second position in which said transversal channel is in facing register and communicates with said fluid exhaust port and said main body obstructs said valve inner channel; and a piston longitudinally movable within said elongated transversal channel between two limit positions.

DESCRIPTION OF THE DRAWINGS

In the annexed drawings:

FIG. 2 is an enlarged schematic cross-sectional view of the inlet valve of the apparatus of FIG. 1;

FIGS. 3 to 5 are schematic cross-sectional views of the rotary valve member only of the valve of FIG. 2, at a smaller scale, sequentially showing the rotary valve member in three positions thereof and suggesting the rotation of the valve member and the linear displacement of the piston with arrows;

DETAILED DESCRIPTION OF THE EMBODIMENTS

Figure 1:
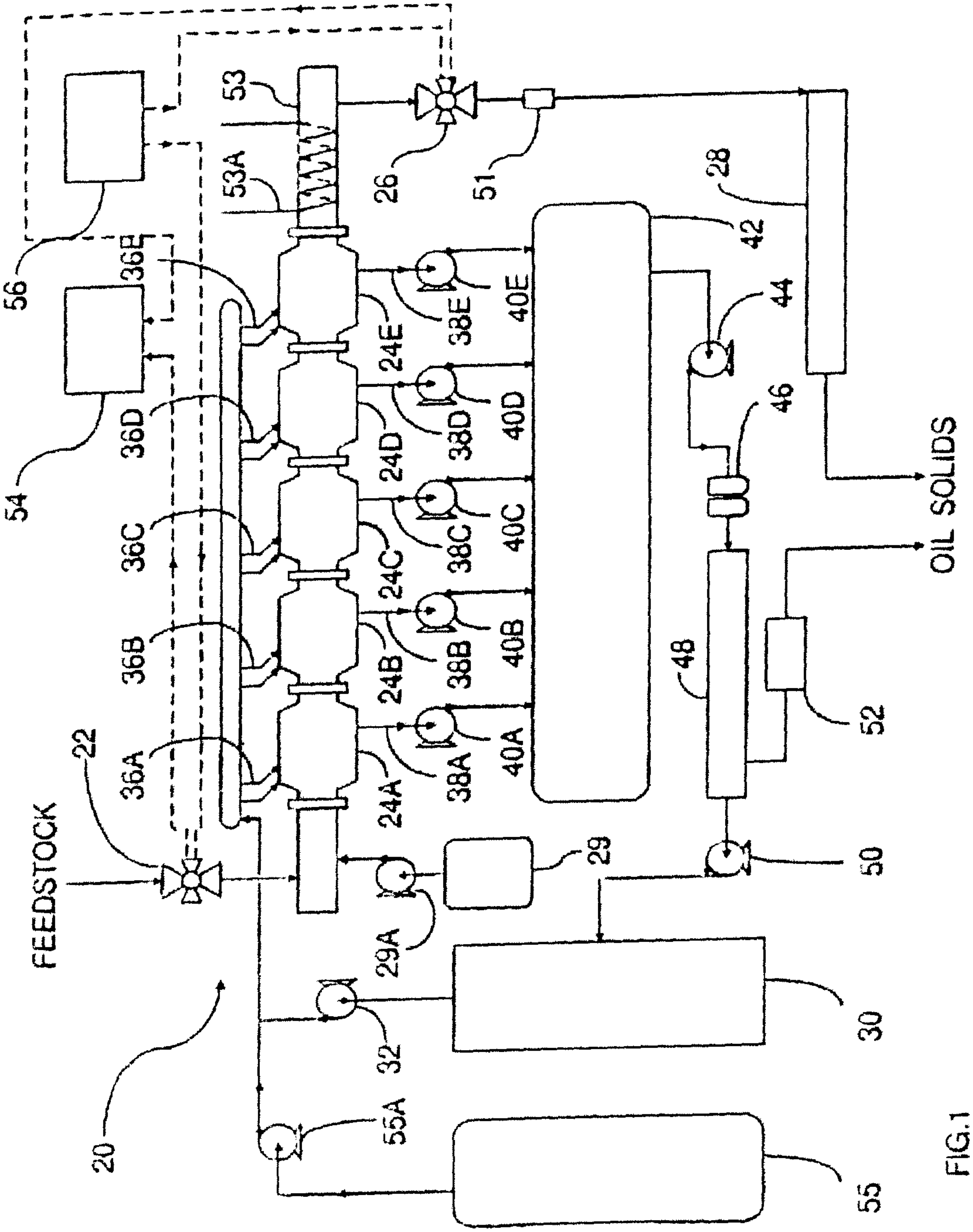
FIG. 1 is a schematic view of an apparatus for carrying out the present invention according to a continuous process for removing oil from an oil-bearing product.

The present invention generally relates to a method and apparatus for removing a solute from a solute-bearing solid product by means of a solvent which remains in liquid state throughout the entire oil extraction process. In one embodiment, the solvent is normally in gaseous state at ambient temperature and pressure values, but is used in liquid state within the method and apparatus of the present invention by maintaining such pressure and temperature values within the apparatus so that the solvent will remain in this liquid state. In another embodiment, the solvent is already in liquid state at ambient temperature and pressure values, and is maintained in this liquid state within the apparatus of the invention.

According to one embodiment of the invention, the solute-bearing product is a solid product containing a certain quantity of oil or fat. The solid product can be, for example, rendered animal tissue, industrial, commercial or domestic oleiferous wastes, oleiferous hazards, oleiferous industrial byproducts, oil bearing sands, strata, mineral, rock formation, fried or soaked substances inedible and edible, legumes and their hulls and casings, seeds and their hulls and casings and/or shells, nuts and their hulls, casings and/or shells, tree leafs and branches and roots, plant leafs and stems, basal leafs and branches and roots, marine life whether organic, mammal or aquatic, field crops and vegetables of every kind, for the separation of the solids from the fats and natural oils organically, intrinsically contained, held or suspended by or in them.

The solvent can be any suitable solvent in which said solute will be soluble at determined extraction pressure and temperature values. In one embodiment, as indicated hereinabove, the solvent will be in a gaseous state at ambient temperature and pressure values, but will be maintained in a liquid state at extraction pressure and temperature values. The solvent may be for example propane or butane mixtures, or a refrigerant.

It is understood that the method and apparatus of the present invention may be used with many different solvents, the exact nature of the solvent depending mostly on the oil-bearing product and the oil contained in the oil-bearing product.

More particularly, the process of the present invention for separating a solute from a solute-bearing solid product comprises the steps of providing an extraction chamber with determined extraction pressure and temperature values; controlling the extraction pressure to maintain it above an ambient pressure value; controlling the extraction temperature to maintain it at a temperature that will not denature the solute nor the solid product; feeding the solute-bearing solid product in the extraction chamber; providing a solvent which is mainly in liquid state at the extraction pressure and temperature values, with the solute being soluble in the solvent at the extraction pressure and temperature values; injecting the solvent on the solute-bearing in the extraction chamber for leaching the solute from the solid product with the solvent; distinctly recuperating the solid product from which at least a portion of the solute has been leached, and a miscella comprising a mixture of the solvent and the solute leached from the solid product; conveying the miscella to a separation unit with determined separation temperature and pressure values, with the solvent remaining mainly in liquid state at the separation temperature and pressure values, and with the separation unit temperature value being controlled to maintain it at a temperature that will not denature the solute; separating the solvent from the solute in the separation unit through one of molecular weight, specific gravity and viscosity differential separation processes; and distinctly recuperating the solvent and the solute separated in the separation unit; wherein the solvent remains in a liquid-state throughout said process.

The process of the invention may be accomplished as a continuous or a batch process.

FIG. 1 is a schematic view of one embodiment of an apparatus 20 used to carry out the process of the present invention as a continuous process.

Apparatus 20 comprises a feedstock inlet valve 22 connected to a number of consecutively contiguous extraction chambers 24*a*, 24*b*, 24*c*, 24*d*, 24*e*, generally referred to as extraction chambers 24, that are in fact extraction chamber portions part of a single extraction chamber, as further detailed hereinafter, since they are in fluid communication with one another. However, in an alternate embodiment which is not illustrated, extraction chamber 24 could be fluidly isolated by suitable valves.

Downstream of extractions chambers 24 is a solid product outlet valve 26 connected to an optional security solvent extraction unit 28. Oil-bearing product, or feedstock, which is to be treated by apparatus 20 to distinctly recuperate the oil and the solid product therefrom, is consequently fed through the feedstock inlet valve 22 and sequentially circulated through the consecutively contiguous extractions chambers 24 where a determined proportion of oil will be extracted from the solid oil-bearing product, as detailed hereinafter. The solid product from which the oil has been extracted is then conveyed through solid product outlet valve 26, towards the outlet of apparatus 20 downstream of security solvent extraction unit 28.

Inlet and outlet valves 22, 26 are valves that allow a continuous or substantially continuous through-flow of solid product, while preventing the through-flow of other fluids. Thus, the solid product may freely flow through valves 22, 26, while there will be no fluid exchange between extraction chambers 24 and the atmosphere.

In one embodiment, to facilitate the treatment of the solid oil-bearing product, the solid product is fed through inlet valve 22 in a granular or pellet format, with the maximum particle size of the solid product being empirically selected and/or calculated for an optimized oil yield.

Determined extraction pressure and temperature values are set and maintained within extraction chambers 24. More particularly, the extraction pressure is controlled to maintain it above ambient pressure value, and the extraction temperature is controlled to maintain it at a temperature that will not denature the oil or the solid oil-bearing product. These extraction temperature and pressure values are set to allow the solvent to be maintained in a liquid state within extraction chambers 24, while in one embodiment, this same solvent would be in a gaseous state at ambient temperature and pressure values. For example, the extraction temperature can be substantially equal to ambient temperature, for example between 1° C. (33° F.) and 40° C. (104° F.), and the extraction pressure can be maintained well above the ambient pressure value, for example at approximately 10 bars. However, these exemplary extraction temperature and pressure values are not to be considered restrictive, as they may vary depending on the nature of the oil, the oil-bearing product and the solvent being used. Still, maintaining an ambient temperature value within extraction chambers 24 has the advantage of helping to prevent most oils and solid products form being denatured, since they would naturally be found at ambient temperature anyway.

One way to maintain the extraction pressure above the ambient pressure, is to have a gas injector pump 29*a* connected to a gas injector 29 which injects gas into extraction chambers 24. FIG. 1 shows a single gas injector 29 for all extraction chambers 24, but it is understood that multiple gas injectors could be provided. The nature of the gas being injected will be discussed hereinafter.

A closed loop liquid solvent circuit is provided within apparatus 20, in which liquid-state solvent is circulated for use in extracting the oil from the oil-bearing product fed into extraction chambers 24. More particularly, a main solvent tank 30 is provided in apparatus 20, within which solvent is stored at such temperature and pressure values so as to remain mainly in liquid state. A solvent pump 32 conveys solvent from main solvent tank 30 to a solvent manifold 34, the latter connected to solvent injectors in the form of a number of independently controlled spray nozzles 36*a*, 36*b*, 36*c*, 36*d*, 36*e*—generally referred to as spray nozzles 36—that will inject solvent in corresponding extraction chambers 24.

Since the solute is soluble in the solvent at the extraction pressure and temperature values, as the solvent is sprayed into extraction chambers 24, it leaches oil from the solid oil-bearing product, with the solvent and oil forming a miscella that is recuperated, for example through a filter (not shown in FIG. 1) that will prevent the solid product particles from flowing therethrough, while allowing the miscella to flow therethrough. The miscella is collected through corresponding miscella outlet channels 38*a*, 38*b*, 38*c*, 38*d*, 38*e*—generally referred to as miscella outlet channels 38. Miscella pumps 40*a*, 40*b*, 40*c*, 40*d*, 40*e*—generally referred to as miscella pumps 40, are connected to miscella channels 38 to ensure an outflow of the miscella from extraction chambers 24. Miscella thus recuperated is conveyed to a miscella collection tank 42. Although a single miscella tank has been shown, it is understood that distinct miscella tanks corresponding to each extraction chamber could also be used. A pump 44 conveys the miscella from miscella tank 42 through a particulate filter 46 and into a separation unit 48 where the oil is separated from the liquid-state solvent through a known liquid-liquid separation process, for example one of molecular weight, specific gravity and viscosity differential separation processes. Also, determined separation temperature and pressure values are maintained within separation unit 48, with the solvent remaining mainly in liquid state at the separation temperature and pressure values, and with the separation unit temperature value being controlled to maintain it at a temperature that will not denature the oil. In one embodiment, the separation temperature and pressure values are identical to the extraction temperature and pressure values, for example approximately ambient temperature and 10 bars, respectively.

The solvent separated from the oil in separator unit 48 is then conveyed by means of a pump 50 back into main solvent tank 30, while the oil separated from the solvent is collected at an oil outlet, after having passed through an optional segregation unit 52 that will remove any remaining residual solvent vapors, if any.

Throughout the closed-loop solvent circuit, the solvent remains mainly in liquid state at all times. In the present specification and claims, although it is indicated that the solvent remains in liquid state, it is understood that some liquid-state solvent will in fact evaporate unless the corresponding surrounding area within apparatus 20 is saturated with solvent vapor—thus in any case some solvent vapor will in fact be present. The solvent will not be entirely in liquid state at all times within apparatus 20. Consequently, when it is stated that the solvent remains in liquid-state, it refers to the active solvent that will be injected through injectors 36, leach the oil from the solid product, form a miscella with the oil, be carried to be separated in liquid state in separation unit 48, and then re-used to be injected through injectors 36. Thus, apart from a proportion of solvent that will naturally evaporate in non-saturated areas of apparatus 20, it can be said that the solvent will remain "mainly" in liquid state.

Maintaining the closed-loop solvent circuit in liquid state may be accomplished for example by maintaining the temperature constant at approximately an ambient temperature value and by maintaining an above-ambient pressure value within the closed-loop solvent circuit. This is particularly advantageous since it will help prevent the oil and the solid product circulated within apparatus 20 from being denatured since they will not be subjected to a considerable amount of heat which is frequent in prior art devices.

In a normal operation mode of apparatus 20, most if not all the liquid-state solvent will be recuperated through the miscella within extraction chambers 24. However, there may be some cases where the solvent is not entirely removed from the solid product when it exits extraction chambers 24, especially some solvent vapors which are resident in the extraction chambers 24 and that remain trapped in the solid product. Thus, optional security solvent extraction unit 28 which is located downstream of outlet valve 26 is used to remove the residual solvent in the solid product by the application of heat to prevent solvent from accidentally exiting apparatus 20. This heat level is relatively low, in that the temperature in the optional security solvent extraction unit 28 will be well below a temperature that could denature the solid product processed therein.

If solvent is removed from the solid product in security solvent extraction unit 28, it may be recuperated, liquefied and conveyed to main solvent tank 30 by means of suitable pipes (not shown). The same is true about solvent vapors recuperated in segregation unit 52. In cases where there is a net loss of least part of the solvent during the oil extraction process of the present invention, then an auxiliary solvent tank 55 equipped with its pump 55*a* can be included in apparatus 20 to provide the required additional solvent to be distributed by manifold 34.

Alternatively, solvent vapor recuperated in security solvent extraction unit 28 can be conveyed to gas injector 29 to be re-used for maintaining the above-ambient pressure within extraction chambers 24. Indeed, it is possible to have solvent vapor-filled extraction chambers 24 which allows the desired pressure to be maintained therein. This does not change the fact that the solvent injected in liquid-state in extraction chambers 24 to leach the oil out of the solid product, will remain mainly in liquid state throughout the process of the present invention. Indeed, the solvent vapor is used to maintain the required pressure, and although a natural exchange between the gaseous-state solvent and the liquid-state solvent will occur, the liquid-state solvent mainly remains in its liquid state. Alternately, if solvent vapor is not used to set and maintain the above-ambient pressure in extraction chambers 24, then another gas can be used in gas injector 29 that will not react with the oil, the solvent or the solid product, for example an inert gas or another unreactive gas such as nitrogen.

An optional heating device 53 is provided between extraction chambers 24 and outlet valve 26. Heating device 53 is equipped with heating means, for example in the form of a heating element 53*a*, for slightly heating the solid product before it is submitted to a sensor device 51 that detects the oil content in the outputted solid product. This detection of oil content may help the operator to properly set the extraction chamber parameters for obtaining a desired oil content in the solid product at the outlet of apparatus 20. Known sensors such as sensor 51 work optimally at a constant temperature, and the purpose of heating element 53 is consequently to maintain the solid product at this constant temperature.

In one embodiment, shown in FIG. 1, inlet and outlet valves 22, 26 are each connected to a vacuum pump 54 and to a compressor 56 that provide appropriate pressure differentials required to (a) prevent gases and fluids from the atmosphere outside of apparatus 20 (e.g. air) from seeping within extraction chambers 24, and (b) prevent gases and fluids from inside apparatus 20 (e.g. solvent vapors) from seeping outside of apparatus 20 through valves 22, 26. Valves 22, 26 more particularly include an intermediate chamber in which a vacuum will be created to remove all fluids therein such as air, before allowing the solid products to be conveyed downstream. Since there is a positive pressure within extraction chambers 24, compressor 56 will further act to pump gas back into valves 22, 26. Some particular embodiments of valves 22, 26 will now be discussed, although it is understood that the present invention is not limited thereto.

FIG. 2 shows a first embodiment of an inlet valve 22. Although valve 26 will not be described in detail, it is understood that valve 26 would be similar to valve 22. In the embodiment of FIG. 2, inlet valve 22 comprises a hollow housing 200 comprising an inner channel 202 defining a feedstock inlet opening 204 opened to the ambient environment, a feedstock outlet opening 206 leading to extraction chambers 24 and a feedstock flow axis extending between inlet and outlet openings 204, 206. An auger 208 is provided at inlet opening 204. Inlet opening may be located at the bottom end of a hopper at least partly filled with feedstock.

Housing 200 also comprises a widened intermediate portion 210 defining a cylindrical inner channel portion 212 in which a complementary cylindrical rotary valve member 214 is rotatable about a rotation axis which is perpendicular to the feedstock flow axis. Rotary valve member 214 defines a main body 215 that engages the valve inner channel 202 in a fluid-tight manner. Rotary valve member 214 comprises a transversal channel 216 in which a piston 218 is longitudinally movable between first and second limit positions corresponding to the two extremities of the rotary valve member transversal channel 216.

An air exhaust port 220, equipped with a solid material filter 222 that allows fluids to pass while preventing solids to pass, is provided on one side of the housing intermediate portion 210, being angularly spaced from the valve inner channel 202 at a 90° angle to the right-hand side of FIG. 2. Air exhaust port 220 is connected to a selectively activated vacuum pump (number 54 in FIG. 1) through a vacuum channel 224, and a gas channel 226 in turn connected to a gas source (number 56 in FIG. 1) is also in communication with air exhaust port 220. The gas circulating through gas channel 226 may be solvent vapor, or any other suitable gas, such as nitrogen for example, which would not chemically react with the solvent, the oil or the solid product.

A solvent exhaust port 228 equipped with a solid material filter 230 that allows fluids to pass while preventing solids to pass, is provided on the side of housing intermediate portion 210 opposite air exhaust port relative to valve inner channel 202—namely the left-hand side in FIG. 2. Solvent exhaust port 228 is thus angularly spaced from the valve inner channel 202 of a 90° angle and from the air exhaust port of a 180.degree. angle. Solvent exhaust port 228 is connected to a selectively activated vacuum pump (number 54 in FIG. 1) through a vacuum channel 232, and to an air channel 234 which is connected to the outside atmosphere.

In use, valve 22 is initially in a position as shown in FIG. 2, with rotary valve member 214 positioned so that transversal channel 216 is coextensive with valve inner channel 202, and with piston 218 being located in a first limit position at or near the extremity of transversal channel 216 which is closest to feedstock inlet opening 204. In this position of rotary valve 214, piston 218 is continuously biased towards its first limit position due to the above-ambient pressure within extraction chambers 24.

Feedstock, for example in the form of granular solid oil-bearing material, can then be forced by auger 208 and by the force of gravity, down into the feedstock inlet opening 204 of valve 22. As feedstock is gradually fed therein, piston 218 will gradually be forced towards its second limit position, against the bias of the pressure within extraction chambers 24. Eventually, piston 218 will reach its second limit position as shown in FIG. 3.

At this point, rotary valve member 214 is rotated of 90° clockwise as shown in FIG. 4, until the open end of transversal channel 216, i.e. the end of transversal channel 216 that is not obstructed by piston 218, comes in facing register with air exhaust port 220. A vacuum is then created in exhaust port 220 and consequently in transversal channel 216, to purge fluids from transversal chamber 216 by sucking all fluids out of transversal channel 216 through vacuum channel 224. Solids are retained in transversal channel 216 by filter 222. This consequently removes all air from within the feedstock-filled transversal channel 216 to prevent any air from being subsequently allowed into extraction chambers 24. Once the vacuum is obtained, the vacuum pump is stopped and gas such as solvent vapor is injected into transversal chamber through gas channel 226, until the pressure within transversal channel 216 becomes substantially equal to that within extraction chambers 24.

Once this is accomplished, rotary valve member 214 is rotated a second time in the same clockwise direction of 90° as shown in FIG. 5, until the open end of transversal channel 216 comes in facing register with the feedstock outlet opening 206 of valve 22. Under the force of gravity, and under piston 218 being pushed downward as new feedstock is fed through feedstock inlet opening 204 by auger 208, the feedstock present in transversal channel 216 will be forced out and through feedstock outlet opening 206.

It is noted that when rotary valve member 214 moves into a position in which its open end comes in facing register with the air exhaust port as shown in FIG. 4, its closed end, i.e. its end which is obstructed by piston 218, then simultaneously comes in facing register with solvent exhaust port 228. A vacuum is then created through vacuum channel 232 to purge all solvent which may be present in the small area at the very extremity of transversal channel provided that piston 218 might not be located exactly at its second limit position and that such a small area may consequently exist. Gas exhaust port 228 thus helps prevent any accidental gas flow out of valve 22. It is noted to this effect that although piston 218 has been shown with flat opposite top and bottom surfaces, it can be made with convex opposite top and bottom surfaces that have a same radius of curvature as that of the outer surface of rotary valve member 214. Once the vacuum pump stops purging fluids through vacuum channel 232, air at atmospheric pressure is injected through air channel 234 to fill the void left by the previously purged fluids. Thus, as the rotary valve member is rotated another 90.degree., all solvent that might have been present between piston 218 and the housing inner wall, will have been previously purged, to prevent solvent from being accidentally exhausted to the atmosphere.

Figure 6:
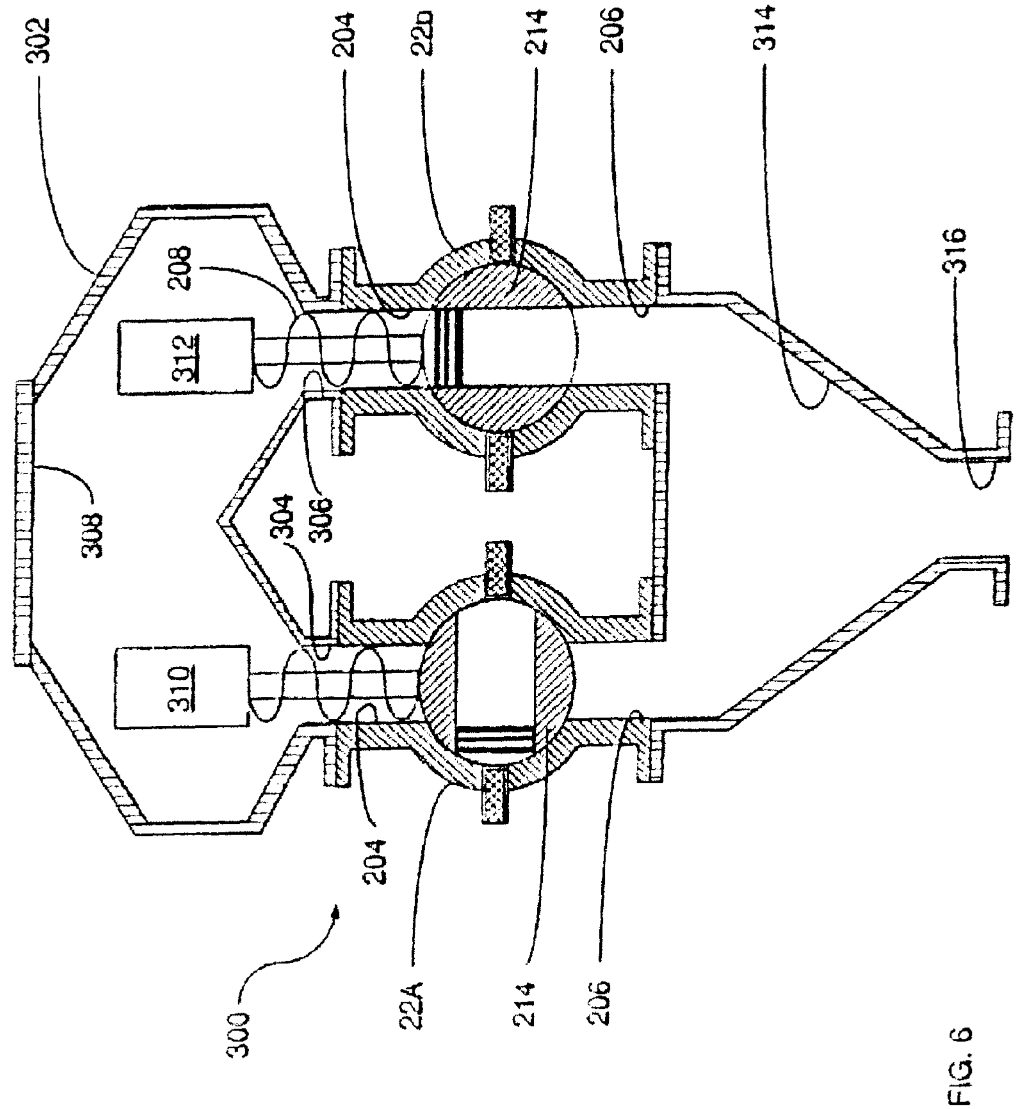
FIG. 6 is a schematic cross-sectional view of an alternate embodiment of a valve assembly according to the present invention that includes two valves similar to the valve of FIG. 2.

FIG. 6 shows another embodiment of a valve assembly 300 according to the present invention, which comprises a pair of valves 22_a_, 22_b_ similar to valve 22 described hereinabove. A hopper 302 is installed atop valves 22_a_, 22_b_, and a pair of tapered bottom openings 304, 306 in hopper 302 provide access to the respective feedstock inlet openings 204, 204 of the valves 22_a_, 22_b_. A removable cover 308 allows access to the inner chamber of hopper 302. A pair of motors 310, 312 control the augers 208, 208 of valves 22_a_, 22_b_. The respective feedstock outlet openings 206, 206 of valves 22_a_, 22_b_ open into a funnel 314 having a funnel outlet opening 316 leading to the extraction chambers 24 (not shown in FIG. 6).

In use, valves 22_a_, 22_b_ work in a similar manner than valve 22 described hereinabove. Feedstock located in hopper 302 is gradually fed simultaneously to both valves 22_a_, 22_b_ through their respective feedstock inlet openings 204, 204. The feedstock is discharged at the respective outlet openings 306, 306 of valves 22_a_, 22_b_ as described hereinabove for valve 22, and funnel 314 directs the incoming feedstock towards the entrance to the extraction chambers 24 (not shown in FIG. 6).

In one embodiment, valves 22_a_, 22_b_ will have regular cycles which are offset relative to each other. More particularly, their respective rotary valve members 214, 214 will be controlled so as to be angularly offset of 90° at all times, thus allowing an alternative feedstock discharge from one valve 22_a_, then the other 22_b_.

In the embodiment of the invention illustrated in FIG. 1, there are shown five sequentially linked extraction chambers 24_a_, 24_b_, 24_c_, 24_d_, 24_e_. The feedstock is conveyed to extraction chambers 24 after having been fed through inlet valve 22, is destined to be conveyed in a continuous manner sequentially through all five of the extraction chambers 24, namely first through extraction chamber 24_a_, then through extraction chamber 24_b_, and so on until it reaches extraction chamber 24_e_, after which it is conveyed outside of the extraction chamber assembly towards heating chamber 53.

Conveying means for conveying the solid product sequentially along the extraction chambers 24 are provided, for example in the form of a single impeller that extends throughout the entire extraction chamber assembly.

Within each extraction chamber 24, solvent is dispensed according to determined extraction chamber solvent injection parameters. More generally, extraction chambers 24 have determined extraction chamber parameters that will influence the oil extraction process therein. These extraction chamber parameters are set according to each oil-bearing solid product being treated, according to the oil to be collected from the solid product, and according to the solvent being used. These parameters can further be modified from one extraction chamber 24 to the other if different extraction chamber parameters are desired in different extraction chambers 24. Parameters which can be modified include, but are not limited to: type of impeller used, including its geometry; rotation speed of impeller if it is a rotatable impeller such as an auger; size of extraction chamber; flow rate of solvent being dispensed in the extraction chamber 24; flow rate of miscella flowing out of the extraction chamber 24; manner of dispensing the solvent, such as by providing particular solvent spray patterns; etc.

The purpose of controlling these parameters is to calibrate the oil leaching process within each extraction chamber 24, and consequently the entire oil leaching process throughout the extraction chamber assembly. Indeed, it will often be desirable to meet certain specific and relatively precise oil recuperation parameters in the end product at the apparatus outlet, for example so as to maximize the oil recuperation or to reach determined oil proportions within the outputted solid product.

Figure 8:
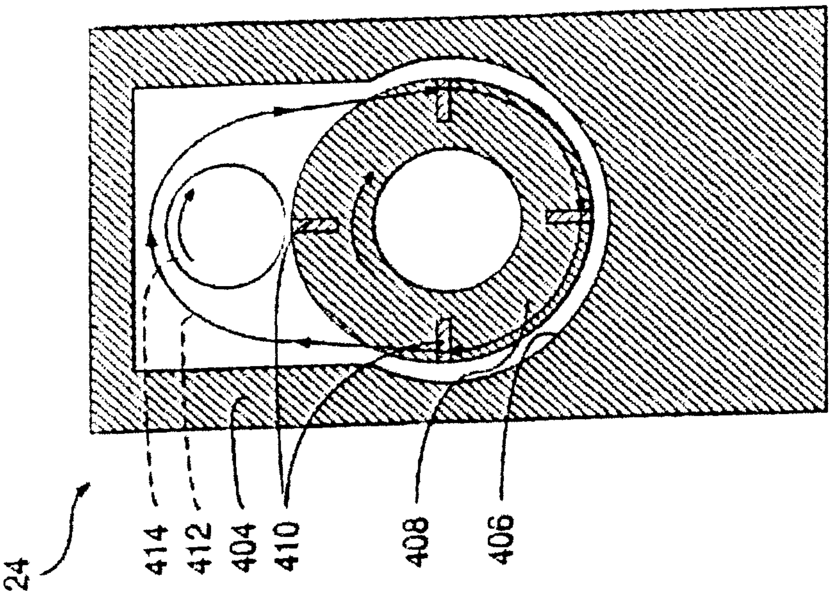
FIG. 8 is a schematic cross-sectional view taken along line VIII-VIII of FIG. 7.
Figure 7:
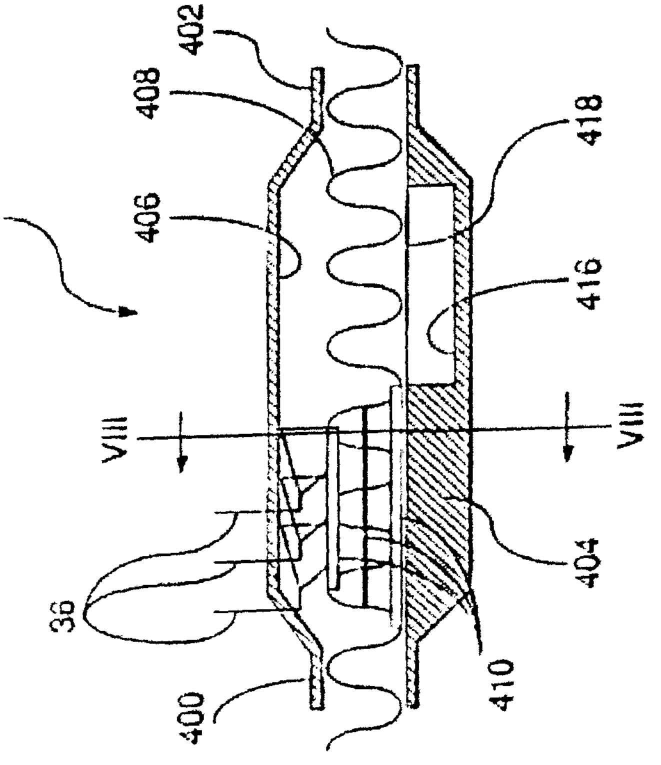
FIG. 7 is a schematic longitudinal cross-sectional view of an extraction chamber according to the present invention.

FIGS. 7 and 8 show one embodiment of an extraction chamber 24, which defines opposite upstream and downstream ends 400 and 402, respectively, and which comprises a hollow housing 404 defining an inner extraction channel 406 extending between the extraction chamber upstream and downstream ends 400, 402. The downstream end 402 of each extraction chamber 24 is in fluid communication with the upstream end 400 of the sequentially adjacent extraction chamber 24, until the last extraction chamber 24*e* which communicates with heating chamber 53. Thus, same extraction pressure and temperature values may be maintained throughout extraction chambers 24. A power-driven impeller in the form of an auger 408 extends through inner channel 406, with auger 408 extending through the entire extraction chamber assembly, from inlet valve 22 to outlet valve 26, including through heating chamber 53. Auger 408 also comprises a number of agitation paddles 410 integrally attached thereto in designated areas of extraction chamber 24. Spray nozzles 36, connected to manifold 34, extend within inner channel 406.

In the embodiment shown in FIGS. 7 and 8, the particles of solid product are conveyed and agitated by auger 408 and are further agitated by agitation paddles 410 in a first portion of each extraction chamber 24 so as to imbue a free-floating product particles flow pattern configuration, for example according to the pattern shown in dotted lines at reference number 412 in FIG. 8. Simultaneously, spray nozzles 36 will inject solvent in such a manner as to imbue the injected solvent with a vortex spray pattern configuration, for example according to the spray pattern schematically shown in dotted lines at reference number 414 in FIG. 8. This solvent vortex pattern will carry some free-floating solid product particles in the vortex, which will enhance the effect of the solvent on the solid product particles, thus enhancing the leaching of oil.

Other alternate solvent injection means could also be envisioned by which solvent is injected in the extraction chambers to leach the oil from the solid products being circulated therein.

The solvent thus injected in extraction chamber 24 will leach a certain proportion of the oil from the oil-bearing product, to form a miscella defined as a mixture of solvent and oil.

Downstream of spray nozzles 36 in extraction chamber 24, is provided a miscella collection trough 416 underneath a filter 418. The miscella, carried by impeller 408, will flow and be collected in trough 416, with the solid product particles being retained by filter 418 within channel 406. It is understood that a suitable filter will be selected according to the type of solvent being used, the type of oil being collected, and the type of solid product being processed. The miscella collected in trough 416 will be carried away through a corresponding miscella outlet channel 38 (FIG. 1) communicating with trough 416.

Extraction chamber 24 consequently defines two different operative portions, namely a first solvent injection portion where solvent is injected in the agitated solid material particles, and a second miscella collecting portion where miscella is collected. Agitation paddles 410 and spray nozzles 36 are present only in the solvent injection portion, and filter 418 and trough 416 are present only in the miscella collecting portion.

According to the invention, it can thus be seen that there is provided a continuous process for extracting oil from an oil-bearing solid product, by which the solid product is continuously fed through inlet valve 22, continuously circulated through extraction chambers 24, and continuously collected at outlet vale 26. Simultaneously, in each extraction chamber 24, a certain proportion of oil is continuously extracted from the oil-bearing product, whereby a final proportion of oil is extracted at the outlet of the entire extraction chamber assembly. It is envisioned, according to one embodiment, to provide suitable sensors of known construction (not shown), similar to sensor 51, to detect the proportion of oil remaining in the solid product at the outlet of each extraction chamber 24, and to use a control mechanism (not shown) to dynamically control the extraction chamber parameters in each extraction chamber 24 so as to obtain a desired remaining oil proportion in the solid products at the outlet of apparatus 20. For example, if it is predetermined that 50%, 90% or even 100% of the oil is to be recuperated from the solid product, then the control mechanism could dynamically control distinctly in each extraction chamber 24 the solvent flow rate, the solvent spray pattern configuration, the rotation speed of the impelling auger, and any other extraction chamber parameter, to modify the oil extraction parameters to obtain the desired result according to the oil proportion detected at the outlet of each extraction chamber 24.

According to the present invention, the series of extraction chambers 24 through which the solid product is sequentially conveyed will allow for up to a very important proportion (if desired), if not all, of the oil to be extracted from the solid product. Indeed, each pass of the solid product through one extraction chamber 24 allows oil to be leached out of the solid product, and consequently providing a series of extraction chambers 24 allows the proportion of oil in the solid product to inversely exponentially tend towards zero, and even eventually reach zero. This oil extraction may also be calibrated by means of the dynamic control over oil extraction within the extraction chambers as described above. Indeed, contrarily to the prior art known to applicant, the present invention makes use of a process for extracting oil in which the extraction chamber parameters may be modified during the operation of apparatus 20 according to the results that are detected by the sensors, either at the apparatus outlet, and/or at the outlet of every individual extraction chamber 24. By dynamically controlling and eventually modifying the extraction chamber parameters such as the solvent spray patterns and flow rate and the impeller speed, for example, the proportion of oil extraction may thus be selectively controlled.

In addition to relying on the sequence of extraction chambers, the selective proportion of oil extraction also relies on the manner by which the oil is extracted within each extraction chamber. Indeed, not only can the extraction chamber parameters be dynamically modified, but the particular agitation of the solid product particles within each extraction chamber 24, together with the vortexes of solvent being created by spray nozzles 36 in each extraction chamber 24, provide for the possibility of a high extraction rate in each extraction chamber 24.

It is understood that a high extraction rate is only referred to herein as a choice or possibility for the operator of apparatus 20. Indeed, while in some cases maximum oil extraction may be desirable such as in the case of soil decontamination, in other cases such as in the preparation of foodstuff a certain proportion of oil content in the outputted solid product may be desirable.

Having an extraction pressure above ambient pressure, for example at approximately 10 bars, is advantageous not only because it allows the use of a solvent in liquid state which would normally be in gaseous state at ambient pressure, for a given temperature value, but also because it increases the efficiency of the process. Indeed, filters 418 with a finer mesh may be used through which the miscella will be transferred, if the extraction pressure is important, to promote the passage of miscella through the filters 418.

It is noted that the respective separation pressure and extraction pressure within separation unit 48 and extraction chambers 24 respectively, may differ.

Figure 9:
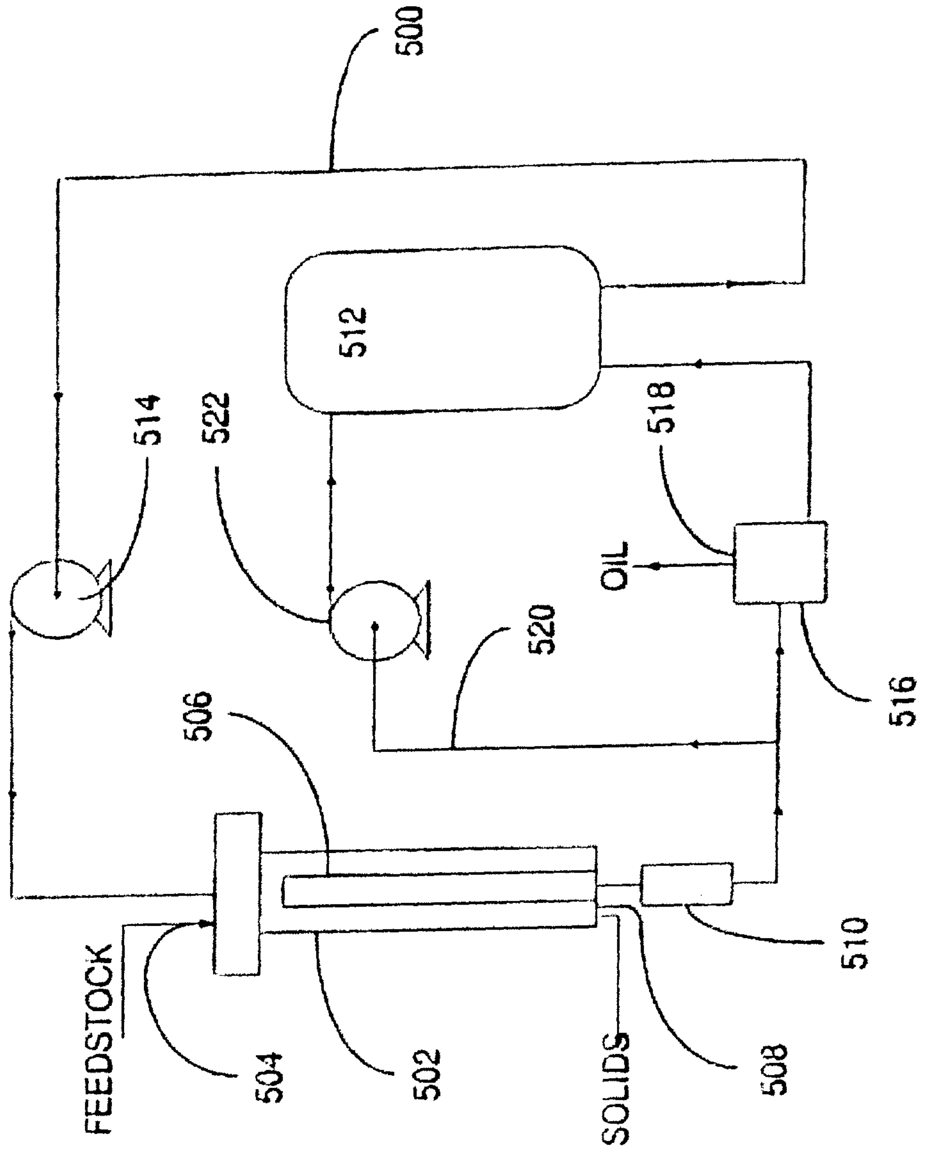
FIG. 9 is a schematic view of an alternate apparatus for carrying out the present invention according to a batch process for removing oil from an oil-bearing product.

An alternate embodiment of the invention is shown in FIG. 9, where a batch process apparatus 500 is schematically shown. Apparatus 500 comprises an extraction chamber 502 including a feedstock inlet 504, which can be closed by a door (not shown) once feedstock is fed into extraction chamber 502. Extraction chamber 502 includes a first coarse filter 506, and an outlet 508 leading to a second fine filter 510. In use, a batch of feedstock comprising solid oil-bearing product is fed through feedstock inlet 504, the door to the extraction chamber 502 is then closed, and the batch oil extraction process can then begin.

For the oil extraction to be accomplished, solvent from a main solvent tank 512 is injected into extraction chamber 502 by means of a solvent injection pump 514. Solvent thus injected leaches a certain proportion of the oil from the oil-bearing product to form a miscella comprising a mixture of oil and solvent. The miscella is collected through the coarse filter 506 while the coarse solid product particles are retained in extraction chamber 502, and then through fine filter 510 while fine particulate solid product is retained by fine filter 510. The miscella thus collected is conveyed to a liquid-liquid separation unit 516 where the oil is separated from the solvent through a suitable liquid-liquid separation process such as one of molecular weight, specific gravity and viscosity differential separation processes. Solvent separated from the oil is conveyed back to main solvent tank 512, while oil separated from the solvent is collected at an oil outlet 518.

There is also provided a solvent vapor circuit 520 including a solvent vapor pump 522 that will convey residual solvent vapor from extraction chamber 502 to carry the solvent back into solvent tank 512 where it will precipitate into liquid state, once a batch of solid material has been treated. This prevents solvent vapor from being exhausted to the atmosphere once the door to the extraction chamber 502 is opened to remove the solid product from therein.

In the embodiment of FIG. 9, the pressure and temperature values are also controlled in extraction chamber 502 and in main solvent tank 512 to maintain the solvent mainly in liquid state throughout the closed-loop circuit of the solvent. Any solvent vapor conveyed by pump 522 back into tank 512 is subjected to temperature and pressure conditions that will make the solvent vapor precipitate. As with the first embodiment showing a continuous process, the solvent remaining mainly in liquid-state throughout its closed-loop circuit prevents any heat from having to be used to separate the oil from the solvent by evaporating the solvent. This absence of heat helps prevent denaturing of the oil.

Any further modification to the present invention, which does not deviate from the scope of the appended claims as will be obvious for a person skilled in the art, is further considered to be included herein.

The invention claimed is:

1. A process for separating a solute from a solute-bearing solid product, wherein the solute-bearing solid product is comprised of oil bearing sands, strata, mineral, rock formation or any combination thereof, comprising the steps of conveying particles of the solute-bearing solid product through an extraction apparatus comprised of a plurality of extraction chambers in series, wherein each extraction chamber includes a solvent injection portion at an upstream end of the extraction chamber and a collecting portion at a downstream end of the extraction chamber, and the particles of the solute-bearing solid product are conveyed from the upstream end to the downstream end of each extraction chamber and agitated in the solvent injection portion;

spraying solvent into the solvent injection portion of each extraction chamber to contact the solute-bearing solid product particles in the solvent injection portion, wherein the solvent is comprised of propane, butane or a combination thereof, and each extraction chamber is solvent-vapor filled; and extracting a mixture of solvent and extracted solute from the downstream end collecting portion of each extraction chamber as solid product is sequentially conveyed through the plurality of extraction chambers, wherein the particles of the solute-bearing solid product are conveyed from the upstream end to the downstream end of each extraction chamber and agitated in the solvent injection portion in a free-floating flow pattern configuration.

2. The process of claim 1, wherein the solute-bearing solid product is conveyed through the extraction apparatus by an impeller.

3. The process of claim 2, wherein the impeller is an auger.

4. The process of claim 1, wherein the solvent is sprayed into the extraction chambers through spray nozzles.

5. The process of claim 1, wherein a portion of the solvent in the solvent-vapor filled extraction chambers is in a liquid state.

6. The process of claim 1, wherein the mixture of the solute and solvent is extracted from each extraction chamber through a filter.

* * * * *